(12) United States Patent
Chan et al.

(10) Patent No.: US 10,452,196 B2
(45) Date of Patent: Oct. 22, 2019

(54) TOUCH SENSING HIGH-LOW DRIVING SCHEME FOR IN-CELL TOUCH LCD DISPLAY

(71) Applicant: Solomon Systech Limited, Hong Kong (HK)

(72) Inventors: Wing Chi Stephen Chan, Hong Kong (HK); Jun Chen, Hong Kong (HK); Sing Ng, Hong Kong (HK)

(73) Assignee: Solomon Systech Limited, Hong Kong (CN)

( * ) Notice: Subject to any disclaimer, the term of this patent is extended or adjusted under 35 U.S.C. 154(b) by 466 days.

(21) Appl. No.: 15/175,059

(22) Filed: Jun. 7, 2016

(65) Prior Publication Data

US 2017/0269779 A1  Sep. 21, 2017

Related U.S. Application Data

(60) Provisional application No. 62/308,234, filed on Mar. 15, 2016.

(51) Int. Cl.
  *G06F 3/041* (2006.01)
  *G06F 3/044* (2006.01)
  *G02F 1/1333* (2006.01)
  *G02F 1/1362* (2006.01)

(52) U.S. Cl.
  CPC ........ *G06F 3/0418* (2013.01); *G02F 1/13338* (2013.01); *G02F 1/136213* (2013.01); *G06F 3/044* (2013.01); *G06F 3/0412* (2013.01)

(58) Field of Classification Search
  None
  See application file for complete search history.

(56) References Cited

U.S. PATENT DOCUMENTS

| 2012/0162133 A1* | 6/2012 | Chen | G06F 3/0412 345/174 |
| 2015/0220208 A1* | 8/2015 | Noguchi | G06F 3/0412 345/174 |

* cited by examiner

*Primary Examiner* — Amare Mengistu
*Assistant Examiner* — Sarvesh J Nadkarni
(74) *Attorney, Agent, or Firm* — Spruson & Ferguson (Hong Kong) Limited (57) ABSTRACT

A capacitive sensing method comprising: driving a first excitation signal onto a sensor electrode, and driving a second excitation signal onto the embedded electrodes. Either the first or the second excitation signal has voltage oscillations of constant first amplitude, while the other has voltage oscillations of varying second amplitude. The second amplitude varies between a high amplitude value that is larger than the first amplitude by an amplitude difference and a low amplitude value that is smaller than the first amplitude by the same amplitude difference. The method further comprises using one or more integrators to integrate an electric current due to combined voltage oscillations of the first and the second excitation signals within an integration cycle, and generate an integrated signal for detecting a capacitive change on the sensor electrode; wherein the integration cycle comprises a plurality of voltage oscillations of the first and the second excitation signals.

2 Claims, 11 Drawing Sheets

-- Prior Art --

TOUCH SENSING HIGH-LOW DRIVING SCHEME FOR IN-CELL TOUCH LCD DISPLAY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM FOR DOMESTIC PRIORITY

This application claims priority under 35 U.S.C. § 119 to the U.S. Provisional Patent Application No. 62/308,234, filed Mar. 15, 2016, the disclosure of which is incorporated herein by reference in its entirety.

FIELD OF THE INVENTION

The present invention generally relates to touch sensing techniques and mechanisms in liquid crystal display (LCD) touch-display panels and other touch sensing input devices. In particular, the present invention relates to methods and apparatuses for enhancing the signal-to-noise ratio of touch signals by reducing the parasitic capacitance on the touch sensors.

BACKGROUND

A touch-sensing-enabled active matrix LCD panel is an active matrix LCD display having an additional function of detecting a location of a possible touch contact made on the panel. The detection may be accomplished by an electrostatic capacitance method. This method is herein referred to as capacitive touch sensing method.

Figure 1:
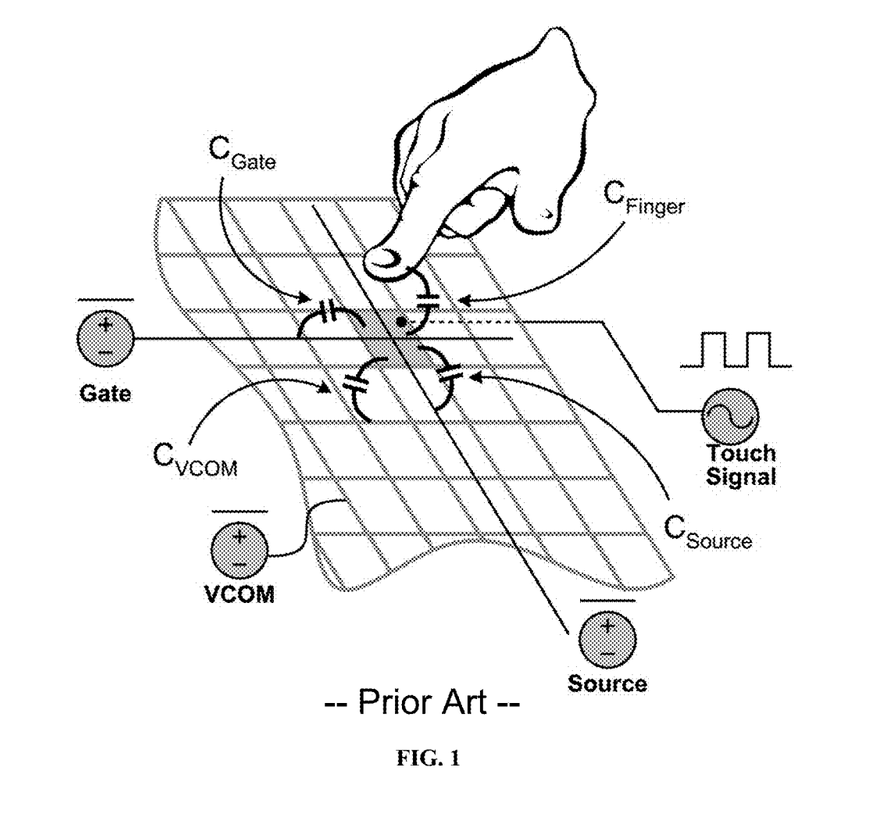
FIG. 1 illustrates the touch capacitance and parasitic capacitance in an exemplary LCD touch-display panel using the self-capacitance sensing method.

In the capacitive touch sensing method, large parasitic capacitance build-up is a common problem that affects the signal-to-noise ratio (SNR) of the touch-sensing signals generated from the touch sensors. The touch sensors are usually made of one or more layers of indium tin oxide (ITO) or metal. The parasitic capacitance build-up on the touch sensors is largely due to the close proximities between the touch sensors and various embedded electrodes in the LCD touch-display panel. These embedded electrodes include the display electrodes inside each display panel sub-pixel, source/data lines, scan/gate lines, and VCOM lines. Referring to FIG. 1. This parasitic capacitance includes $C_{Source}$, $C_{Gate}$, and $C_{VCOM}$, which can be in the order of 20~100 pF.

One of the various capacitive touch sensing methods, self-capacitive sensing, is based on driving the sensor electrodes with an excitation waveform (hereinafter referred to as "sensor electrode excitation signal"), which is normally in the form of multiple voltage cycles, and in return detect the electric charge going forward and backward through the sensor electrodes as a means for capacitance measurement. The sensor electrode excitation signal provides the energy for toggling the touch sensors between a ground state and a predefined potential state. When a contact is made on the touch-display panel, extra capacitance (i.e. $C_{Finger}$ as shown in FIG. 1) is added to a touch sensor electrode, causing the electric charge going forward and backward through the touch sensor electrode to increase. Since these changes in capacitance caused by touch contacts are usually very small, in the order of 0.5 pF, the reduction of parasitic capacitance can substantially increase the analog dynamic range of the touch sensing. The better analog dynamic range in turn enhances the SNR of the digitized touch signals for better resolution using the same analog-to-digital converter (ADC) as in the case without the parasitic capacitance reduction.

Various methods have been developed with the goal of reducing parasitic capacitance. One such method is to drive the embedded electrodes with an excitation signal (hereinafter referred to as "embedded electrodes excitation signal") that is similar to the sensor electrode excitation signal used for driving the touch sensors. By doing so, the voltage difference between the touch sensors and the embedded electrodes can remain constant, preventing the build-up of the parasitic capacitance. The present invention improves upon the current methods with varying voltage differences between the touch sensors and the embedded electrodes.

SUMMARY OF THE INVENTION

In accordance to various embodiments of the present invention, a signal-driving scheme for touch sensing and a touch analog frontend (TAFE) design for LCD touch-display panel are provided. It is an objective of the present invention to eliminate the effect of the parasitic capacitance on touch sensing with the use of such touch-sensing signal-driving scheme and the TAFE design. It is also an objective of the present invention to mitigate certain imperfections in the ADC used in the touch sensing circuitry, such as quantization noise and uneven quantization steps, by providing a multi-level analog signal to the input of the ADC.

In a first embodiment, during a touch-sensing period of the touch-display panel operation, a sensor electrode regular excitation signal is provided for driving a sensor electrode, wherein the sensor electrode regular excitation signal is a square wave signal, in which the amplitude alternates periodically between a maximum value and a minimum value. The sensor electrode regular excitation signal is generated by an active integrator, which follows an escorting signal provided by a regular pulse generator.

In addition, an embedded electrodes high-low excitation signal is provided for driving the embedded electrodes, wherein the embedded electrodes high-low excitation signal is similar to the sensor electrode regular excitation signal except that within each positive-negative-positive-negative cycle, the embedded electrodes high-low excitation signal has its first positive going transition with a voltage amplitude higher than that of the sensor electrode regular excitation signal by a first voltage difference, followed by a first negative going transition, then by a second positive going transition with a voltage amplitude lower than that of the sensor electrode regular excitation signal by a second voltage difference, and then by a second negative going transition. The absolute value of first voltage difference is substantially equal to that of second voltage difference. In short, the embedded electrodes high-low excitation signal $V_2$ contains positive alternating high square pulses and low square pulses.

In this first embodiment, the TAFE that couples with the touch-sensing signal-driving scheme comprises a positive pulse integrator and a negative pulse integrator connected in parallel to each other. The parallel-connected pair of integrators is connected in series with each of the sensor electrodes with the sensor electrode feeding the negative inputs of both integrators. An escorting signal, generated by a regular pulse generator, is feeding the positive inputs of both integrators, indirectly driving the sensor electrode. And both outputs of the positive pulse integrator and the negative pulse integrator are feeding the differential input ports of the ADC. Both integrators are also configured to reset (discharge their respective storage capacitors) before each integration cycle begins.

With this TAFE design, the positive pulse integrator integrates the signal charges as received at its inputs, taking into account the touch capacitance and parasitic capacitance. By the operation of integrating the first and second positive pulses of the combined result of the sensor electrode regular excitation and the embedded electrodes high-low excitation signals within each integration cycle, the effect of the parasitic capacitance is eliminated in the resulting positive output charge of the positive pulse integrator. Similarly, the negative pulse integrator integrates the first and second negative pulses of the combined result of the sensor electrode regular excitation and the embedded electrodes high-low excitation signals within each integration cycle resulting in a negative output charge, voided of the effect of the parasitic capacitance.

In a second embodiment, during a touch-sensing period of the touch-display panel operation, an embedded electrodes regular excitation signal is provided for driving the embedded electrodes, wherein the embedded electrodes regular excitation signal is a square wave signal, in which the amplitude alternates periodically between a maximum value and a minimum value. Also, a sensor electrode high-low excitation signal is provided for indirectly driving the sensor electrodes, wherein the sensor electrode high-low excitation signal is similar to the regular square wave embedded electrodes regular excitation signal except that within each positive-negative-positive-negative cycle, the sensor electrode high-low excitation signal has a first positive going transition with a voltage amplitude higher than that of the embedded electrodes regular excitation signal by a first voltage difference, followed by a first negative going transition, then by a second positive going transition with a voltage amplitude lower than that of the embedded electrodes regular excitation signal by a second voltage difference, and then by a second negative going transition. The absolute value of the first voltage difference is substantially equal to that of the second voltage difference.

In short, the sensor electrode high-low excitation signal contains positive alternating high square pulses and low square pulses. In practice, the DC voltage levels of the embedded electrodes regular excitation signal and the sensor electrode high-low excitation signal are not exactly the same, and the phase angles of the two signals are not identical but in close proximity with the embedded electrodes regular excitation signal slightly lagging the sensor electrode high-low excitation signal.

In this second embodiment, the TAFE that couples with the touch-sensing signal-driving scheme has the same design as in the first embodiment, which comprises the same positive pulse integrator and a negative pulse integrator connected in parallel to each other. In this second embodiment, however, feeding the positive inputs of both integrators is a sensor electrode high-low excitation signal and that driving the embedded electrodes is an embedded electrodes regular excitation signal whereas it is a sensor electrode regular excitation signal feeding the positive inputs of both integrators and an embedded electrodes high-low excitation signal driving the embedded electrodes in the first embodiment.

In a third embodiment, a touch-sensing signal-driving scheme that is the same as that in the first embodiment is provided. The TAFE design in this third embodiment, however, uses only a positive pulse integrator connected in series with each sensor electrode. This TAFE design is simpler than that of the first embodiment. This provides the advantages of lower manufacturing cost and die space savings. On the other hand, the single pulse integrator output as a single-end input to the ADC would have poorer SNR than the positive and negative pulse integrator outputs combined as a differential input to the ADC.

In a forth embodiment, a touch-sensing signal-driving scheme that is the same as that in the second embodiment is provided. The TAFE design in this forth embodiment is the same as that in the third embodiment, except that feeding the positive input of the positive pulse integrator is a sensor electrode high-low excitation signal and that driving the embedded electrodes is an embedded electrodes regular excitation signal whereas it is a sensor electrode regular excitation signal feeding the positive input of the positive pulse integrator and an embedded electrodes high-low excitation signal driving the embedded electrodes in the third embodiment.

BRIEF DESCRIPTION OF THE DRAWINGS

Embodiments of the invention are described in more detail hereinafter with reference to the drawings, in which.

DETAILED DESCRIPTION

In the following description, methods and apparatuses for capacitive touch sensing and the like are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The present invention provides various methods and apparatuses for capacitive touch sensing that eliminates the effect of parasitic capacitance. The various embodiments of the present invention can be used for LCD touch-display panels employing self-capacitive sensing techniques and mechanisms. The aforesaid parasitic capacitance is the capacitance build-up on touch sensors, which is largely due to the close proximities between the touch sensors and various embedded electrodes in the LCD touch-display panel. These embedded electrodes include the display electrodes inside each display panel sub-pixel, source/data lines, scan/gate lines, and VCOM lines. This parasitic capacitance can be in the order of 20~100 pF.

Before the methods and the apparatuses as disclosed herein are elaborated, a background description on active integrator is provided.

Background on Active Integrator:

A electrical current, i(t), being integrated over time is an electrical charge, Q(t). For a capacitive circuit:

$$Q(t)=C*V(t);\quad(1)$$

where C is the capacitance of the capacitor of the capacitive circuit and V(t) is the voltage across the capacitor. Since V(t) is proportional to the integral of electrical current over time, a capacitive circuit operates according to below equation:

$$V(t) = \frac{1}{C} \int_{start}^{end} i(t)dt + V_{c0};\quad(2)$$

where $V_{c0}$ is the initial voltage of the capacitive circuit at the beginning of the integration cycle. From equation (2), one recognizes that using a capacitive integrator circuit to measure current flowing forward and backward through the touch sensor electrode is convenient since voltage can easily be digitized into digital data by an ADC.

Figure 2:
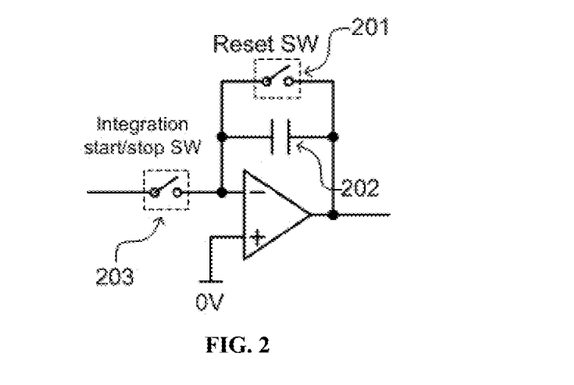
FIG. 2 depicts the circuit diagram of an active integrator in accordance to various embodiments of the present invention.

FIG. 2 depicts the circuit diagram of an active integrator in accordance to various embodiments of the present invention. In this active integrator, a reset switch 201 is connected in parallel with a storage capacitor 202. Before an integration cycle starts, the reset switch 201 is closed, discharging the storage capacitor 202 to uncharged state. Thus, the initial output voltage of the active integrator is zero. Based on equation (2), the active integrator's output voltage over time V(t) at the end of an integration cycle can be simplified to:

$$V(t) = \frac{1}{C} \int_{start}^{end} i(t)dt;\quad(3)$$

In addition, the integration start/stop switch 203 is used to setup the integration cycle periods.

First Embodiment

Figure 3:
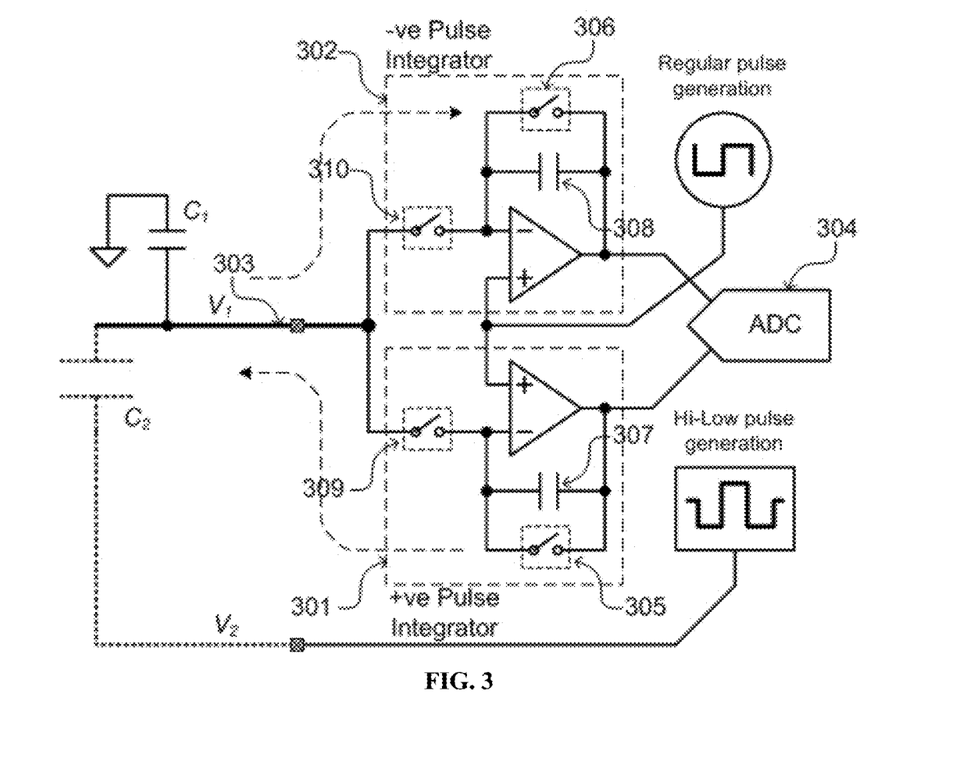
FIG. 3 depicts the circuit diagram illustrating the touch analog frontend (TAFE) design and touch-sensing signal-driving scheme in accordance to a first embodiment of the present invention.

FIG. 3 depicts the circuit diagram illustrating the touch analog frontend (TAFE) design and touch-sensing signal-driving scheme in accordance to a first embodiment of the present invention. Only a single sense channel and TAFE circuitry is shown in FIG. 3 for clarity. In a legitimate implementation, multiple sense channels and TAFE circuitries are deployed in parallel. During a touch-sensing period of the touch-display panel operation, a sensor electrode regular excitation signal $V_1$ is provided for driving a sensor electrode, wherein $V_1$ is a square wave signal, in which the amplitude alternates periodically between a maximum value and a minimum value. The positive going transitions and the negative going transitions of $V_1$ have substantially similar slopes. In real-life applications, multiple sense channels are driven by multiple sensor electrode regular excitation signals simultaneously. Each of the sensor electrode regular excitation signals is generated by an active integrator, which follows an escorting signal provided by a regular pulse generator.

In addition, an embedded electrodes high-low excitation signal $V_2$ is provided for driving the embedded electrodes, wherein $V_2$ is similar to the sensor electrode regular excitation signal $V_1$ except that within each positive-negative-positive-negative cycle, $V_2$ has its first positive going transition with a voltage amplitude higher than that of $V_1$ by a first voltage difference $\Delta V_1$, followed by a first negative going transition, then by a second positive going transition with a voltage amplitude lower than that of $V_1$ by a second voltage difference $\Delta V_2$, and then by a second negative going transition. The absolute value of $\Delta V_1$ is substantially equal to that of $\Delta V_2$; thus $\Delta V_1=\Delta V_2=\Delta V$.

In short, the embedded electrodes high-low excitation signal $V_2$ contains positive alternating high square pulses and low square pulses. In practice, the DC voltage levels of $V_1$ and $V_2$ are not exactly the same, and the phase angles of the two signals are not identical but in close proximity with the $V_2$ slightly lagging V.

In this first embodiment, the TAFE that couples with the touch-sensing signal-driving scheme comprises a positive pulse integrator 301 and a negative pulse integrator 302 connected in parallel to each other. The parallel-connected pair of integrators is connected in series with each of the sensor electrodes 303 with the sensor electrode feeding the negative inputs of both integrators 301 and 302. An escorting signal, generated by a regular pulse generator, is feeding the positive inputs of both integrators, indirectly driving the sensor electrodes 303. And both outputs of the positive pulse integrator 301 and the negative pulse integrator 302 are feeding the differential input ports of the ADC 304. Both integrators have reset switches 305 and 306 respectively. The reset switches 305 and 306 are configured to close, discharging their respective storage capacitors 307 and 308, before the start of an integration cycle. The integrators are also provided with integration start/stop switches 309 and 310 respectively for setting up the integration cycle periods for the respective integrators (closed during positive pulses for the positive pulse integrator and closed during negative pulses for the negative pulse integrator).

Figure 4:
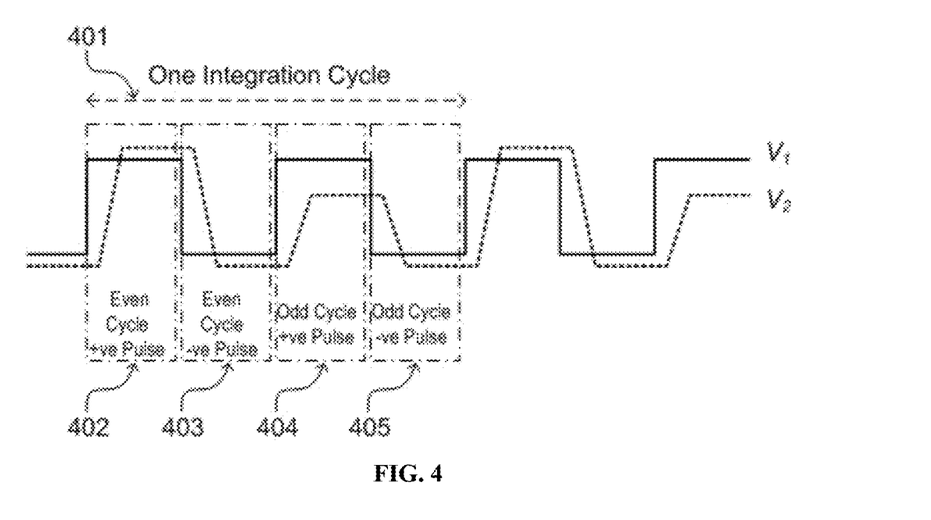
FIG. 4 shows the time-amplitude graph of the excitation signals for both touch sensor electrodes and various embedded electrodes in accordance to the first embodiment of the present invention.

Referring to FIG. 4. Each positive-negative-positive-negative cycle of the sensor electrodes regular excitation signal $V_1$ and the embedded electrodes high-low excitation signal $V_2$ can be regarded as an integration cycle 401. Within each integration cycle, the time period between the first positive going transition (or first rising edge) and just before the first negative going transition (or first falling edge) of $V_1$ can be logically labeled as the even cycle positive pulse 402; the time period between the first negative going transition (or first falling edge) and just before the second positive going transition (or second rising edge) of $V_1$ can be logically labeled as the even cycle negative pulse 403; the time period between the second positive going transition (or second rising edge) and just before the second negative going transition (or second falling edge) of $V_1$ can be logically labeled as the odd cycle positive pulse 404; and the time period between the second negative going transition (or second falling edge) and just before the first positive going transition (or first rising edge) of the next integration cycle of $V_1$ can be logically labeled as the odd cycle negative pulse 405. It should be noted that the even and odd cycles are arbitrarily labeled for the purpose of illustrating the concept underlying the present invention only.

With this TAFE design, the positive pulse integrator integrates the charges as received at its inputs, taking into account the touch capacitance and parasitic capacitance. By the operation of integrating the even cycle positive/negative pulses and the odd cycle positive/negative pulses of the combined result of the sensor electrode regular excitation and the embedded electrodes high-low excitation signals, the effect of the parasitic capacitance is eliminated. This is explained in the steps below:

1. Before each integration cycle, the reset switches 305 and 306 close momentarily to discharge the storage capacitors 307 and 308 of their respective integrators.
2. The integration start/stop switch 309 closes during the even cycle positive pulse and odd cycle positive pulse in each integration cycle; thus the charge at the output of the positive pulse integrator 301 at the end of the even positive pulse period, $Q_{even+}$, is:

$$Q_{even+} = C_1 \|V_1(t)\|_{even} + C_2(\|V_1(t)\|_{even} - \|V_2(t)\|_{even}); \quad (4)$$

where $C_1$ is the touch capacitance and $C_2$ is the parasitic capacitance. Since during the even positive pulse period, $\|V_2(t)\|_{even} = \|V_1(t)\|_{even} + \Delta V$, equation (4) becomes:

$$Q_{even+} = C_1 \|V_1(t)\|_{even} - C_2 \Delta V. \quad (5)$$

The charge at the output of the positive pulse integrator 301 at the end of the odd positive pulse period, $Q_{odd+}$ for only the odd positive pulse period is:

$$Q_{odd+} = C_1 \|V_1(t)\|_{odd} + C_2(\|V_1(t)\|_{odd} - \|V_2(t)\|_{odd}). \quad (6)$$

Since during the odd positive pulse period, $\|V_2(t)\|_{odd} = \|V_1(t)\|_{odd} - \Delta V$, equation (6) becomes:

$$Q_{odd+} = C_1 \|V_1(t)\|_{odd} + C_2 \Delta V. \quad (7)$$

And the total charge $Q_+$ at the output of the positive pulse integrator 301 at the end of the integration cycle is $Q_{even+} + Q_{odd+}$. Since $$\|V_1(t)\|_{even} = \|V_1(t)\|_{odd} = \|V_1(t)\|,$$

$$Q_+ = 2C_1 \|V_1(t)\|. \quad (8)$$

3. The integration start/stop switch 310 closes during the even cycle negative pulse and odd cycle negative pulse in each integration cycle; thus the charge at the output of the negative pulse integrator 302 at the end of the even negative pulse period, $Q_{even-}$, is:

$$-Q_{even-} = C_1 \|V_1(t)\|_{even} + C_2(\|V_1(t)\|_{even} - \|V_2(t)\|_{even}); \quad (9)$$

Since during the even negative pulse period, $\|V_2(\|V_2(t)\|V_1(t)\|_{even} - \Delta V$, equation (9) becomes:

$$-Q_{even-} = C_1 \|V_1(t)\|_{even} + C_2 \Delta V \quad (10)$$

The charge at the output of the negative pulse integrator 302 at the end of the odd negative pulse period, $Q_{odd-}$ for only the odd negative pulse period is:

$$-Q_{odd-} = C_1 \|V_1(t)\|_{odd} + C_2(\|V_1(t)\|_{odd} - \|V_2(t)\|_{odd}). \quad (11)$$

Since during the odd negative pulse period, $\|V_2(t)\|_{odd} = \|V_1(t)\|_{odd} + \Delta V$, equation (11) becomes:

$$-Q_{odd-} = C_1 \|V_1(t)\|_{odd} - C_2 \Delta V. \quad (12)$$

And the total charge $Q_-$ at the output of the negative pulse integrator 302 at the end of the integration cycle is $-Q_{even-} + -Q_{odd-}$; or $$Q_- = -2C_1 \|V_1(t)\|. \quad (13)$$

4. Both $Q_+$ and $Q_-$ are then taken as differential input, be sampled and digitized by the ADC 304.

As can be seen, the parasitic capacitance $C_2$ is eliminated during the integration.

Second Embodiment

Figure 5:
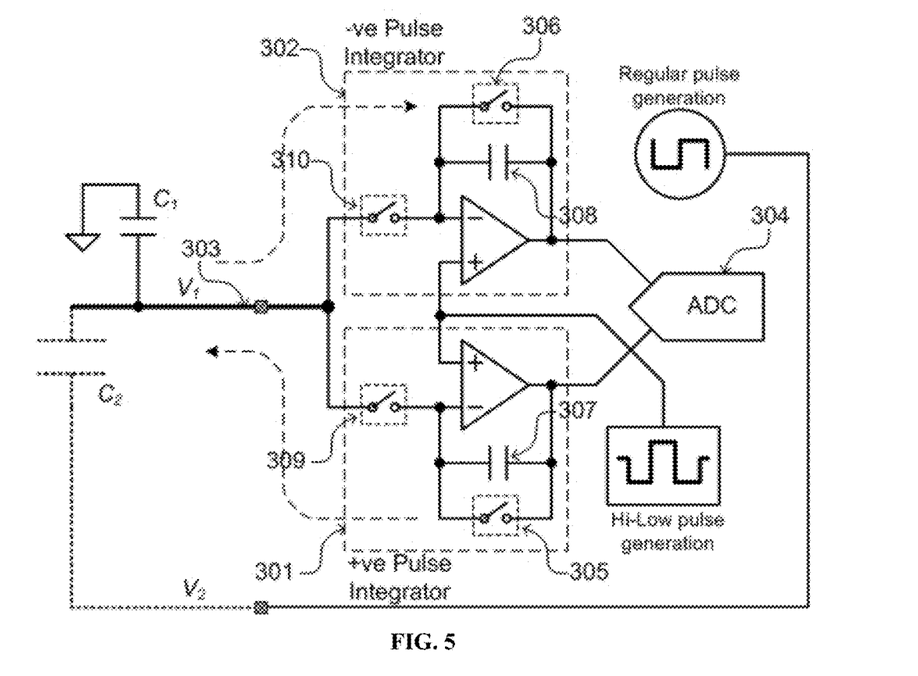
FIG. 5 depicts the circuit diagram illustrating the TAFE design and touch-sensing signal-driving scheme in accordance to a second embodiment of the present invention.

FIG. 5 depicts the circuit diagram illustrating the TAFE design and touch-sensing signal-driving scheme in accordance to a second embodiment of the present invention. Again only a single sense channel and TAFE circuitry is shown in FIG. 5 for clarity. In a legitimate implementation, multiple sense channels and TAFE circuitries are deployed in parallel. In this second embodiment, during a touch-sensing period of the touch-display panel operation, an embedded electrodes regular excitation signal $V_2$ is provided for driving the embedded electrodes, wherein $V_2$ is a square wave signal, in which the amplitude alternates periodically between a maximum value and a minimum value. The positive going transitions and the negative going transitions of $V_2$ have substantially similar slopes.

In addition, a sensor electrode high-low excitation signal $V_1$ is provided for indirectly driving the sensor electrodes, wherein $V_1$ is similar to the embedded electrodes regular excitation signal $V_2$ except that within each integration cycle, $V_1$ has its first positive going transition with a voltage amplitude higher than that of $V_2$ by the voltage difference $\Delta V$, followed by a first negative going transition, then by a second positive going transition with a voltage amplitude lower than that of $V_2$ by the same voltage difference $\Delta V$, and then by a second negative going transition.

In short, the sensor electrode high-low excitation signal $V_1$ contains positive alternating high square pulses and low square pulses. In practice, the DC voltage levels of $V_2$ and $V_1$ are not exactly the same, and the phase angles of the two signals are not identical but in close proximity with $V_2$ slightly lagging $V_1$.

In this second embodiment, the TAFE that couples with the touch-sensing signal-driving scheme has the same design as in the first embodiment, which comprises the same positive pulse integrator 301 and a negative pulse integrator 302 connected in parallel to each other. In this second embodiment, however, feeding the positive inputs of both integrators is a sensor electrode high-low excitation signal and that driving the embedded electrodes is an embedded electrodes regular excitation signal whereas it is a sensor electrode regular excitation signal feeding the positive inputs of both integrators and an embedded electrodes high-low excitation signal driving the embedded electrodes in the first embodiment.

Figure 6:
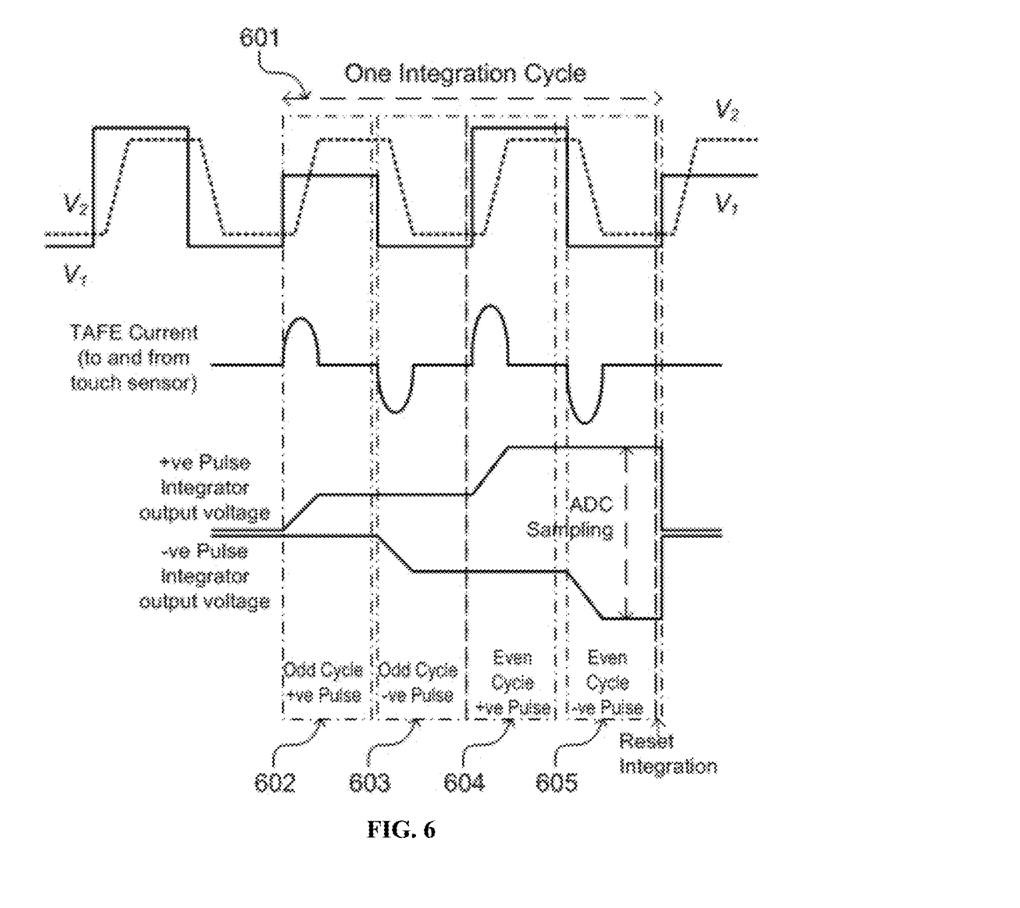
FIG. 6 shows the time-amplitude graph of the excitation signals for both touch sensor electrodes and various embedded electrodes, TAFE current to and from the touch sensor, and the integrators' output voltage levels in accordance to the second embodiment of the present invention.

Referring to FIG. 6. Similar to the first embodiment, each positive-negative-positive-negative cycle of the sensor electrode high-low excitation signal $V_1$ and the embedded electrodes regular excitation signal $V_2$ can be regarded as an integration cycle 601; and the integration of the even cycle positive/negative pulses and the odd cycle positive/negative pulses of the combined result of the sensor electrode high-low excitation and the embedded electrodes regular excitation signals, the effect of the parasitic capacitance is eliminated. This is explained in the steps below:

1. Before each integration cycle, the reset switches 305 and 306 close momentarily to discharge the storage capacitors 307 and 308 of their respective integrators.
2. The integration start/stop switch 309 closes during the even cycle positive pulse and odd cycle positive pulse in each integration cycle; thus the charge at the output of the positive pulse integrator 301 at the end of the even positive pulse period, $Q_{even+}$, is still governed by:

$$Q_{even+}=C_1\|V_1(t)\|_{even}+C_2(\|V_1(t)\|_{even}-\|V_2(t)\|_{even}); \qquad (4)$$

Since, however in this second embodiment, during the even positive pulse period, $\|V_1(t)\|_{even}=\|V_2(t)\|_{even}+\Delta V$, equation (4) becomes:

$$Q_{even+}=C_1(\|V_2(t)\|_{even}+\Delta V)+C_2\Delta V. \qquad (14)$$

The charge at the output of the positive pulse integrator 301 at the end of the odd positive pulse period, $Q_{odd+}$ for only the odd positive pulse period is still governed by:

$$Q_{odd+}=C_1\|V_1(t)\|_{odd}+C_2(\|V_1(t)\|_{odd}-\|V_2(t)\|_{odd}). \qquad (6)$$

Since, however in this second embodiment, during the odd positive pulse period, $\|V_1(t)\|_{odd}=\|V_2(t)\|_{odd}-\Delta V$, equation (6) becomes:

$$Q_{odd+}=C_1(\|V_2(t)\|_{odd}-\Delta V)-C_2\Delta V. \qquad (15)$$

And the total charge $Q_+$ at the output of the positive pulse integrator 301 at the end of the integration cycle is $Q_{even+}+Q_{odd+}$. Since $$\|V_2(t)\|_{even}=\|V_2(t)\|_{odd}=\|V_2(t)\|,$$

$$Q_+=2C_1\|V_2(t)\|. \qquad (16)$$

3. The integration start/stop switch 310 closes during the even cycle negative pulse and odd cycle negative pulse in each integration cycle; thus the charge at the output of the negative pulse integrator 302 at the end of the even negative pulse period, $Q_{even-}$, is still governed by:

$$-Q_{even-}=C_1\|V_1(t)\|_{even}+C_2(\|V_1(t)\|_{even}-\|V_2(t)\|_{even}); \qquad (9)$$

Since, however in this second embodiment, during the even negative pulse period, $\|V_1(t)\|_{even}=\|V_2(t)\|_{even}-\Delta V$, equation (9) becomes:

$$-Q_{even-}=C_1(\|V_2(t)\|_{even}-\Delta V)-C_2\Delta V. \qquad (17)$$

The charge at the output of the negative pulse integrator 302 at the end of the odd negative pulse period, $Q_{odd-}$ for only the odd negative pulse period is still governed by:

$$-Q_{odd-}=C_1\|V_1(t)\|_{odd}+C_2(\|V_1(t)\|_{odd}-\|V_2(t)\|_{odd}). \qquad (11)$$

Since, however in this second embodiment, during the odd negative pulse period, $\|V_1(t)\|_{odd}=\|V_2(t)\|_{odd}+\Delta V$, equation (11) becomes:

$$-Q_{odd-}=C_1(\|V_2(t)\|_{odd}+\Delta V)+C_2\Delta V. \qquad (18)$$

And the total charge $Q_-$ at the output of the negative pulse integrator 302 at the end of the integration cycle is $-Q_{even-}+-Q_{odd-}$; or $$Q_-=-2C_1\|V_2(t)\|. \qquad (13)$$

4. Both $Q_+$ and $Q_-$ are then taken as differential input, be sampled and digitized by the ADC 304.

As can be seen, the parasitic capacitance $C_2$ is eliminated during the integration.

Third Embodiment

Figure 7:
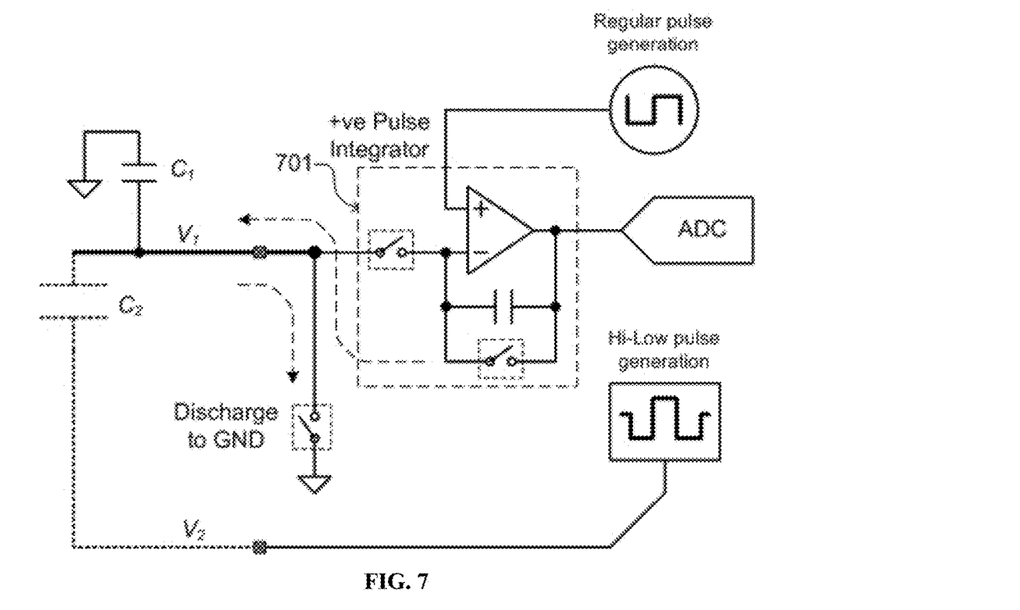
FIG. 7 depicts the circuit diagram illustrating the TAFE design and touch-sensing signal-driving scheme in accordance to a third embodiment of the present invention.

Referring to FIG. 7. In a third embodiment, a touch-sensing signal-driving scheme that is the same as that in the first embodiment is provided. The TAFE design in this third embodiment, however, uses only a positive pulse integrator 701 connected in series with each sensor electrode. This TAFE design is simpler than that of the first embodiment. This provides the advantages of lower manufacturing cost and die space savings. On the other hand, the single positive pulse integrator 701 output as a single-end input to the ADC would have poorer SNR than the combined positive and negative pulse integrator outputs as a differential input to the ADC.

Fourth Embodiment

Figure 8:
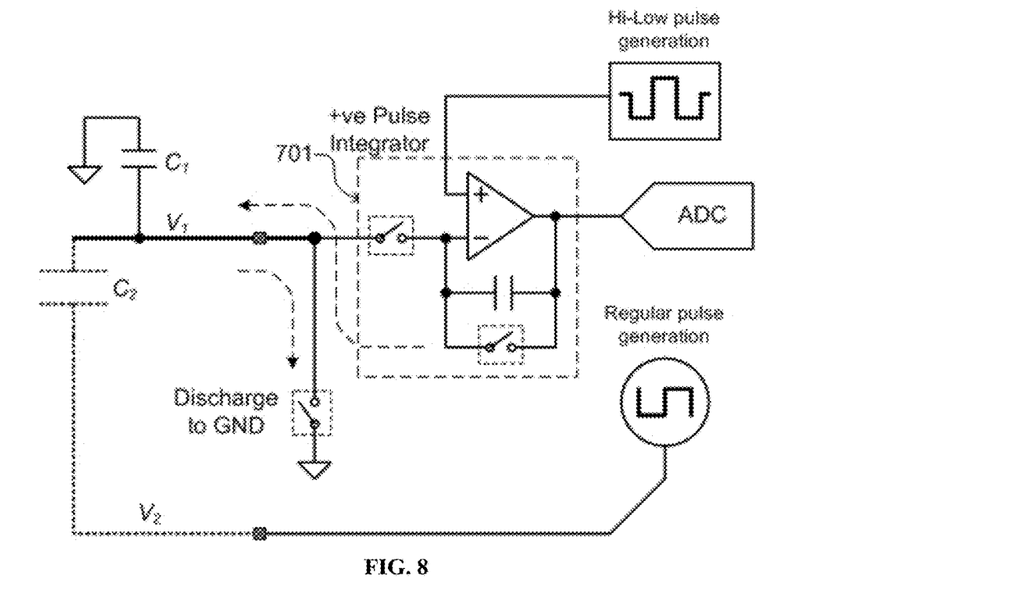
FIG. 8 depicts the circuit diagram illustrating the TAFE design and touch-sensing signal-driving scheme in accordance to a forth embodiment of the present invention.

Referring to FIG. 8. In a forth embodiment, a touch-sensing signal-driving scheme that is the same as that in the second embodiment is provided. The TAFE design in this forth embodiment is the same as that in the third embodiment, except that feeding the positive input of the positive pulse integrator 701 is a sensor electrode high-low excitation signal and that driving the embedded electrodes is an embedded electrodes regular excitation signal whereas it is a sensor electrode regular excitation signal feeding the positive input of the positive pulse integrator 701 and an embedded electrodes high-low excitation signal driving the embedded electrodes in the third embodiment.

Other Embodiments

Variant TAFE designs of the third and forth embodiment can be derived using a negative pulse integrator for integrating the even and odd negative pulses instead of the positive pulse integrator.

In the above-described embodiments, each integration cycle consists of the even cycle positive pulses of the sensor electrode excitation signal and the embedded electrodes excitation signal, the even cycle negative pulses of the sensor electrode excitation signal and the embedded electrodes excitation signal, the odd cycle positive pulses of the sensor electrode excitation signal and the embedded electrodes excitation signal, and the odd cycle negative pulses of the sensor electrode excitation signal and the embedded electrodes excitation signal. Basically, one pair of even-odd cycle positive pulses and/or one pair of even-odd cycle negative pulses are used in the integration for elimination of the effect of the parasitic capacitance. Variants of the above-described embodiments may use any number of pairs of even-odd cycle positive and/or negative pulses in the integration.

"High-High-Low-Low" Touch-Sensing Signal-Driving Scheme

Figure 9:
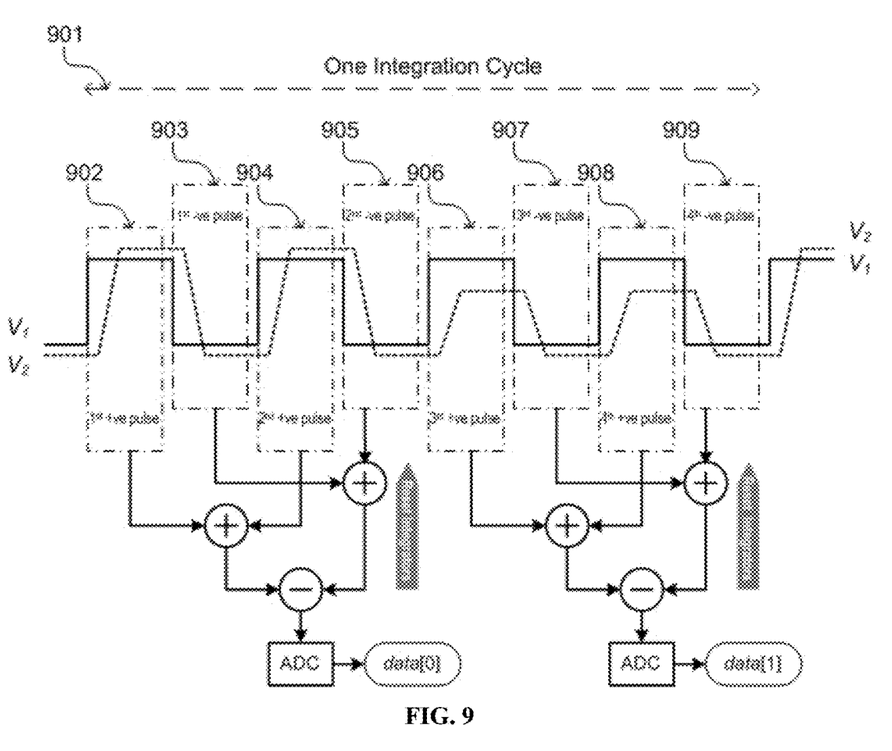
FIG. 9 illustrates a touch-sensing signal-driving scheme in accordance to an alternative embodiment of the present invention.

Referring to FIG. 9. In one alternative embodiment, a sensor electrode regular excitation signal $V_1$ is provided for driving the sensor electrode, wherein $V_1$ is a square wave signal, in which the amplitude alternates periodically between a maximum value and a minimum value. An embedded electrodes high-low excitation signal $V_2$ is provided for driving the embedded electrodes, wherein $V_2$ is similar to $V_1$ except that within each integration cycle, $V_2$ has its first positive going transition with a voltage amplitude higher than that of $V_1$ by a voltage difference $\Delta V$, followed by a first negative going transition, then by a second positive going transition with a voltage amplitude again higher than that $V_1$ by the voltage difference $\Delta V$, followed by a second negative going transition, then followed by a third positive going transition with a voltage amplitude lower than that of $V_1$ by the voltage difference $\Delta V$, followed by a third negative going transition, then by a forth positive going transition with a voltage amplitude lower than that of $V_1$ by the voltage difference $\Delta V$, followed by a forth negative going transition. Thus, the touch-sensing signal-driving scheme of this alternative embodiment has an integration cycle 901 consisted of a first high positive square pulse 902, a first negative square pulse 903, a second high positive square pulse 904, a second negative square pulse 905, a third low positive square pulse 906, a third negative square pulse 907, a forth low positive square pulse 908, and lastly a forth negative square pulse 909 in the order as they are listed.

Using the same TAFE of the first embodiment, the first and second positive square pulses 902 and 904 are integrated by the positive pulse integrator 301, while the first and second negative square pulses 903 and 905 are integrated by the negative pulse integrator 302 in a first half integration, providing a first differential input to be sampled and digitized by the ADC 304 to generate a first touch-sensing signal data: data[0]. Then, the third and forth positive square pulses 906 and 908 are integrated by the positive pulse integrator 301, while the third and forth negative square pulses 907 and 909 are integrated by the negative pulse integrator 302 in a second half integration, providing a first differential input to be sampled and digitized by the ADC 304 to generate a second touch-sensing signal data: data[1]. The digitized value of the actual combined result of the regular excitation signal and the high-low excitation signal differential charge input is the average of data[0] and data[1]: (data[0]+data[1])/2.

Figure 10:
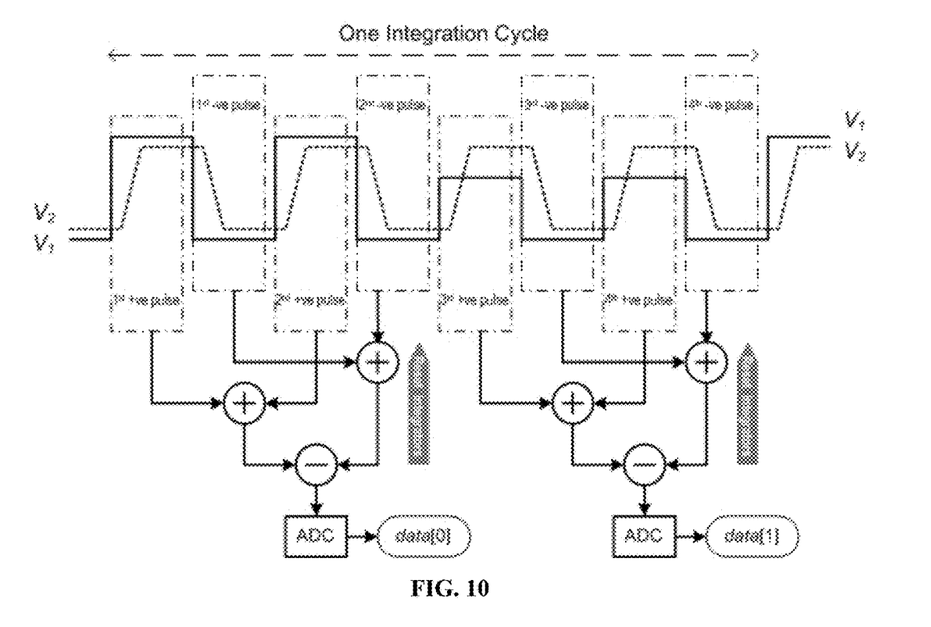
FIG. 10 illustrates a touch-sensing signal-driving scheme in accordance to yet another alternative embodiment of the present invention.

Similar to the touch-sensing signal-driving scheme provided in the second embodiment, in another alternative embodiments, driving the sensor electrode is a "high-high-low-low" sensor electrode high-low excitation signal, and that driving the embedded electrodes is an embedded electrodes regular excitation signal. This is illustrated in FIG. 10.

The "high-high-low-low" touch-sensing signal-driving schemes provided in the above-described alternative embodiments do not only eliminate the effect of the parasitic capacitance (after conversion by the ADC), it mitigates certain imperfections in ADC, which will be explained below.

Mitigating ADC Transfer Curve Non-Linearity

Being able to employ any number of pairs of even-odd cycle positive pulses and/or any number of pairs of even-odd cycle negative pulses in the integration of the sensor electrode excitation signal and the embedded electrodes excitation signal is useful in mitigating ADC transfer curve non-linearity.

Unlike the majority of ADC applications (e.g. video and audio encoding), which weigh the performance of ADC on the effective number of bits (ENOB), signal-to-noise-and-distortion ratio (SINAD), and total harmonic distortion (THD), capacitive touch sensing applications emphasize the importance of differential non-linearity (DNL) but neglect the performance of integral non-linearity (INL) of the ADCs. The reason for this is due to the fact that the difference in capacitance between two touch sensors (inside the same touch panel) can be large (e.g. 30%), but the delta change in sensor capacitance between touch and no touch is small (e.g. 1~2%). The successive-approximation-register (SAR) ADC is the preferred architecture in the medium-high resolution (e.g. 10-bit to 12-bit) and medium speed (e.g. <5MSPS) ADC applications.

Figure 11A:
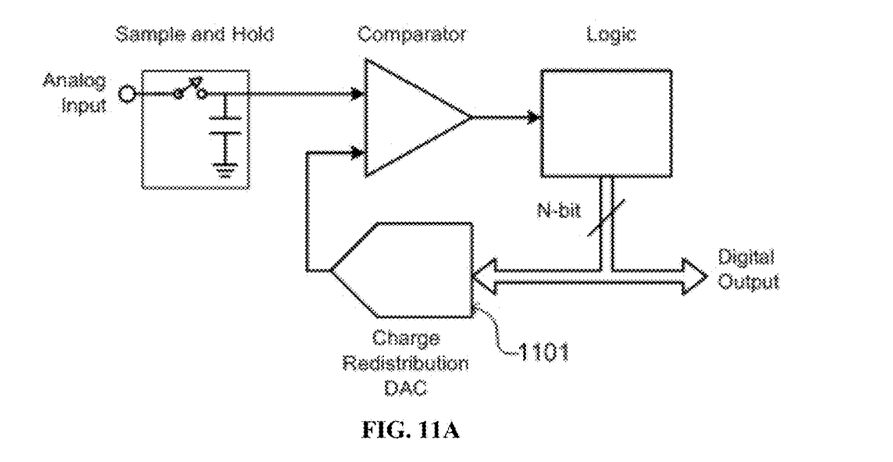
FIG. 11A depicts a simplified circuit diagram of an exemplary embodiment of a SAR ADC.
Figure 11B:
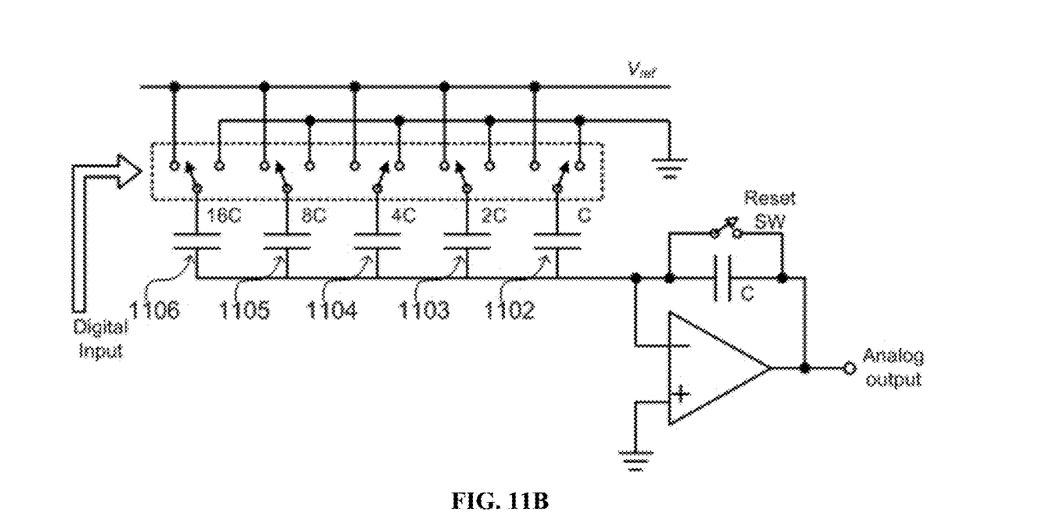
FIG. 11B depicts a simplified circuit diagram of a charge redistribution DAC in the SAR ADC.
Figure 12:
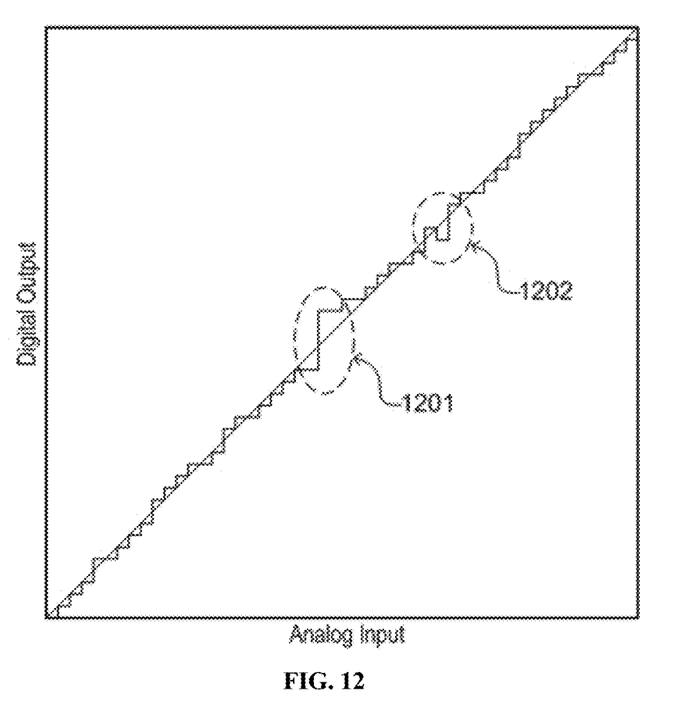
FIG. 12 shows a typical analog-to-digital transfer curve of a SAR ADC.

SAR ADCs have a well-known problem due to their capacitive scaling architecture using charge redistribution digital-to-analog converters (DACs). Referring FIGS. 11A and 11B. In this exemplary SAR ADC (other SAR ADCs may have different number of scaling capacitors and/or capacitance ratios), capacitive scaling relies on the ratios of the scaling capacitors 1102, 1103, 1104, 1105, and 1106 to be exactly $C_{unit}$, $2C_{unit}$, $4C_{unit}$, $8C_{unit}$, and $16C_{unit}$ in the charge redistribution DAC 1101, where $C_{unit}$ is the unit-capacitor. However, capacitive scaling cannot be done perfectly at the IC level due to parasitic capacitance build-up between the bottom plates of the scaling capacitors and the substrate of the IC. This in turn creates non-linearity in the analog-to-digital transfer curve of the SAR ADC. For example, FIG. 12 shows a typical analog-to-digital transfer curve of the SAR ADC having two dead-zones 1201 and 1202, in which analog signal amplitude levels are not converted to digital values linearly.

Figure 13:
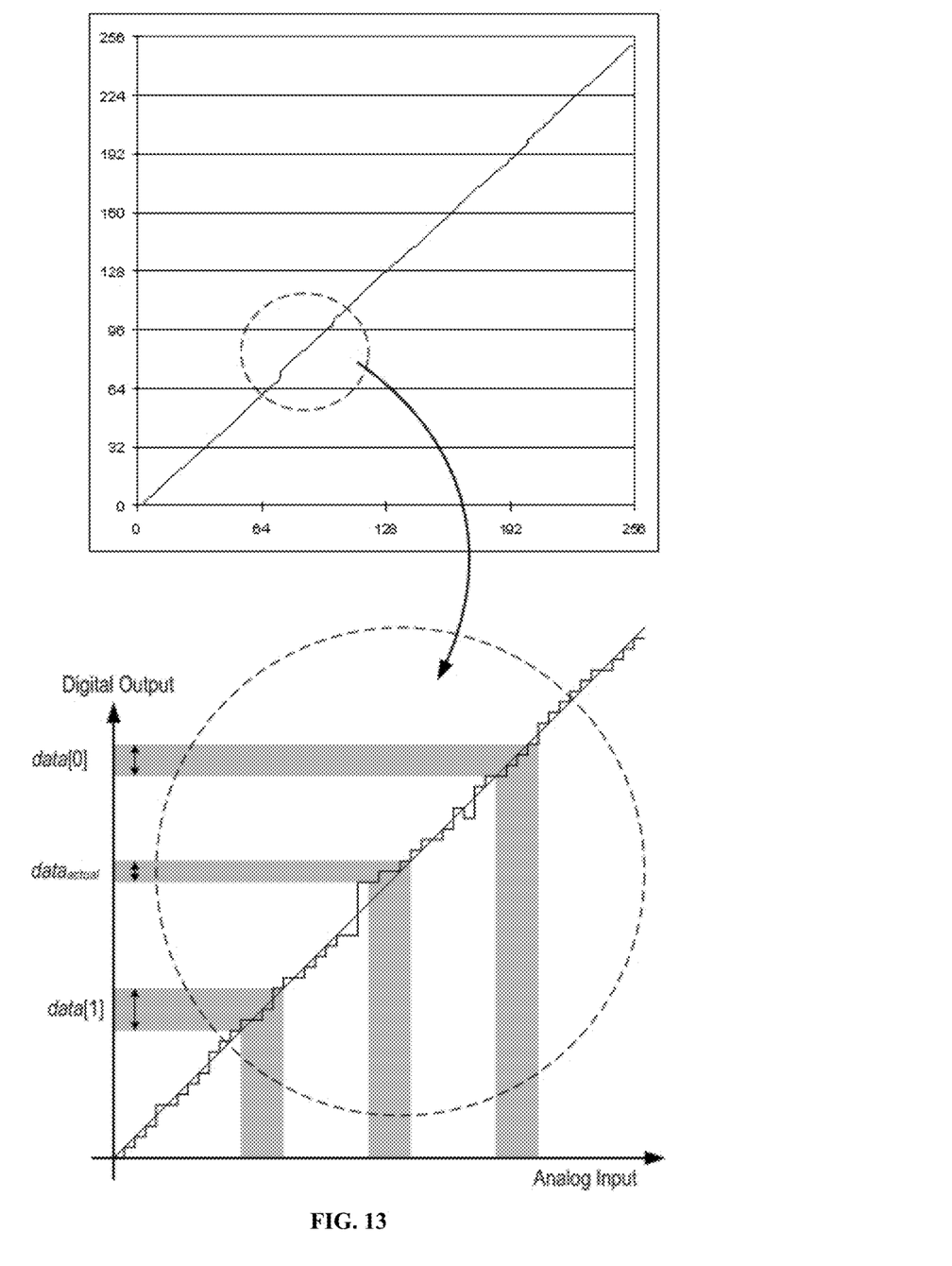
FIG. 13 shows the analog-to-digital transfer curve of a SAR ADC and illustrates the mitigation of its non-linearity.

Using a particular number of pairs of even-odd cycle positive-negative pulses in the integration, or the "high-high-low-low" touch-sensing signal-driving scheme as described above provides a differential input to the ADC that shifts and spreads the conversion point away from the dead-zones on the analog-to-digital transfer curve of the ADC. For example, referring to FIG. 13, using the "high-high-low-low" touch-sensing signal-driving scheme, two differential inputs to the ADC are provided to the ADC to generate the digitized values: data[0] and data[1], avoiding the dead-zone, where the actual combined result of the regular excitation signal and the high-low excitation signal differential charge input to the ADC would have fallen within.

Ground Noise Suppression

Figure 14:
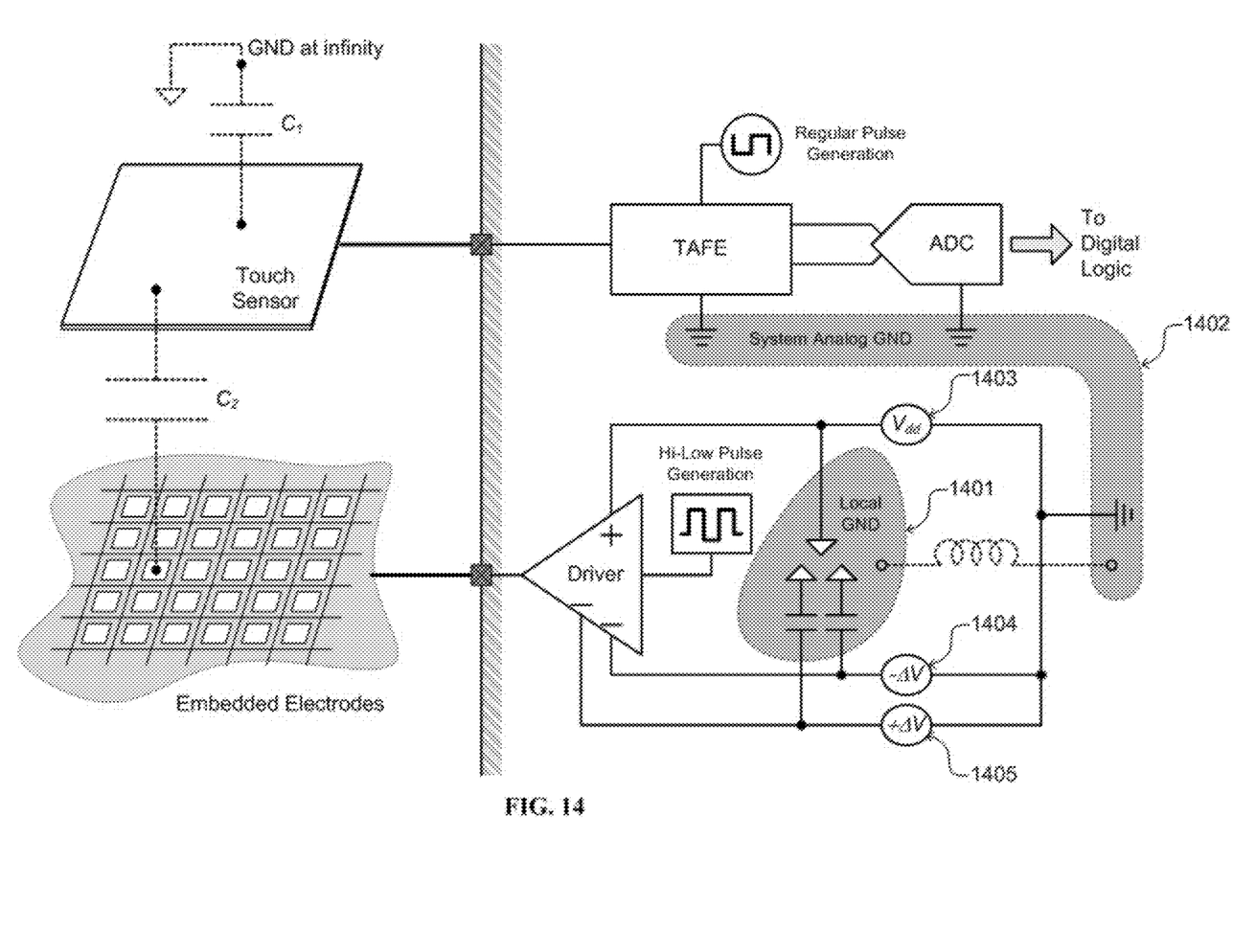
FIG. 14 illustrates the various ground connections in an exemplary LCD touch-display driver integrated circuit (IC) using the self-capacitance sensing method.

Referring to FIG. 14. Another advantage of the various embodiments of touch-sensing signal-driving scheme and the TAFE design in accordance to the present invention is to prevent noise from the relatively noisy local ground 1401 of the pulse generators and power supplies to contaminate the system analog ground 1402 of the various components in the touch display panel, including the TAFEs and ADCs. The suppression of noise in the system analog ground 1402 is of particular importance because the TAFEs and ADCs are to process signals of relatively small amplitude, which are sensitive to signal ground noise.

The high and low square pulses in the various embodiments of the touch-sensing signal-driving scheme are driven by at least three power supplies 1403, 1404, and 1405 of three different voltage levels: $V_{dd}$, $-\Delta V$, and $+\Delta V$ respectively. Hence, the high positive pulse has an amplitude: $V_{dd}-(-\Delta V)=V_{dd}+\Delta V$, and the low positive pulse has an amplitude: $V_{dd}-(+\Delta V)=V_{dd}-\Delta V$. The switching currents of the high and low square pulses are relatively large, particularly in the embodiments where an embedded electrodes high-low excitation signal is driving the extensive embedded electrodes. With such large switching currents, the local ground 1401 is, thus, relatively noisy. Fortunately, the amounts of power dragged from the −ΔV power supply 1404 and the +ΔV power supply 1405 are the same and can counter balance each other after a short transient response time. Hence, the net current flowing between the system analog ground 1402 and the local ground 1401 is small, avoiding contaminating the system analog ground 1402 by the noisy local ground 1401.

In practical implementation, the touch-sensing signal-driving scheme can be realized as part of an integrated touch-display driver or controller of a LCD touch-display panel. The embodiments of the apparatuses as disclosed above may be fabricated as an integrated device or an integrated circuit.

Although the various embodiments of the present invention described above are applied to LCD touch-display panels employing self-capacitive sensing techniques and mechanisms, modifications to the various embodiments can be realized by a practitioner skilled in the art to adapt to other capacitive sensing techniques and mechanisms, such as those of mutual-capacitive sensing, and other touch sensing devices without departing from the scope and spirit of the invention.

The various electronic embodiments of the methods and apparatuses as disclosed herein may be implemented using general purpose or specialized computing devices, computer processors, or electronic circuitries including but not limited to application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The foregoing description of the present invention has been provided for the purposes of illustration and description. It is not intended to be exhaustive or to limit the invention to the precise forms disclosed. Many modifications and variations will be apparent to practitioners skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. A capacitive sensing apparatus for performing self-capacitive sensing, comprising:
   one or more sensor electrodes;
   one or more embedded electrodes;
   a generator configured to:
      generate a first excitation signal and a second excitation signal;
      drive the first excitation signal onto at least one of the sensor electrodes; and
      drive the second excitation signal onto the embedded electrodes;
      wherein the first excitation signal and the second excitation signal are periodic waveform signals having alternating peaks and troughs of substantially same frequencies and phases;
      wherein the second excitation signal has voltage oscillations of a constant first amplitude while the first excitation signal has voltage oscillations of a varying second amplitude;
      wherein each voltage oscillation is a positive going pulse or a negative going pulse;
      wherein the second amplitude varies between a high amplitude value that is larger than the first amplitude by an amplitude difference and a low amplitude value that is smaller than the first amplitude by the amplitude difference; and
      wherein the voltage oscillations of the first excitation signal have repeated series of the high amplitude value, followed by the high amplitude value, followed by the low amplitude value, and lastly followed by the low amplitude value;
      and
   one or more integrators configured to:
      integrate a first electric current due to combined voltage oscillations of the first excitation signal and the second excitation signal within a first integration cycle, wherein the first integration cycle comprises the voltage oscillations within periods of time when the first excitation signal is having the voltage oscillations of high amplitude value;
      integrate a second electric current due to combined voltage oscillations of the first excitation signal and the second excitation signal within a second integration cycle, wherein the second integration cycle comprises the voltage oscillations within periods of time when the first excitation signal is having the voltage oscillations of low amplitude value; and
      generate one or more first integrated signals for detecting a capacitive change on the sensor electrodes and one or more second integrated signals;
      wherein the first integration cycle comprises a plurality of voltage oscillations of the first excitation signal and the second excitation signal; and
      wherein when combining the first integrated signals and the second integrated signals, the amplitude differences within the first integration cycle and the second integration cycle cancel each other after the integration.

2. A capacitive sensing method for performing self-capacitive sensing, comprising:
   generating a first excitation signal and a second excitation signal;
   driving the first excitation signal onto one or more sensor electrodes;
   driving the second excitation signal onto one or more embedded electrodes;
      wherein the first excitation signal and the second excitation signal are periodic waveform signals having alternating peaks and troughs of substantially same frequencies and phases;
      wherein the second excitation signal has voltage oscillations of a constant first amplitude while the first excitation signal has voltage oscillations of a varying second amplitude;
      wherein each voltage oscillation is a positive going pulse or a negative going pulse; and
      wherein the second amplitude varies between a high amplitude value that is larger than the first amplitude by an amplitude difference and a low amplitude value that is smaller than the first amplitude by the amplitude difference; and wherein the voltage oscillations of the first excitation signal have repeated series of the high amplitude value, followed by the high amplitude value, followed by the low amplitude value, and lastly followed by the low amplitude value;

integrating a first electric current due to combined voltage oscillations of the first excitation signal and the second excitation signal within a first integration cycle, wherein the first integration cycle comprises the voltage oscillations within periods of time when the first excitation signal is having the voltage oscillations of high amplitude value;

integrating a second electric current due to combined voltage oscillations of the first excitation signal and the second excitation signal within a second integration cycle, wherein the second integration cycle comprises the voltage oscillations within periods of time when the first excitation signal is having the voltage oscillations of low amplitude value; and generating one or more first integrated signals for detecting a capacitive change on the sensor electrodes and generating one or more second integrated signals;
wherein the first integration cycle comprises a plurality of voltage oscillations of the first excitation signal and the second excitation signal; and
wherein when combining the first integrated signals and the second integrated signals, the amplitude differences within the first integration cycle and the second integration cycle cancel each other after the integration.

* * * * *